United States Patent
Shi et al.

(10) Patent No.: US 12,395,089 B2
(45) Date of Patent: Aug. 19, 2025

(54) CIRCUIT FOR BI-DIRECTIONAL CONVERTER, BI-DIRECTIONAL CONVERTER AND OPERATION METHOD THEREOF

(71) Applicant: Infineon Technologies Austria AG, Villach (AT)

(72) Inventors: Sanbao Shi, Shenzhen (CN); Xingshen Zhang, Shenzhen (CN); Yue Chen, Shenzhen (CN); Cheng Zhang, Shenzhen (CN)

(73) Assignee: Infineon Technologies Austria AG, Villach (AT)

( * ) Notice: Subject to any disclaimer, the term of this patent is extended or adjusted under 35 U.S.C. 154(b) by 229 days.

(21) Appl. No.: 18/192,485

(22) Filed: Mar. 29, 2023

(65) Prior Publication Data

US 2023/0318471 A1    Oct. 5, 2023

(30) Foreign Application Priority Data

Mar. 30, 2022  (CN) .......................... 202210323640.0

(51) Int. Cl.
  *H02M 3/335*  (2006.01)
  *H02M 1/00*  (2007.01)

(52) U.S. Cl.
  CPC ..... *H02M 3/33584* (2013.01); *H02M 1/0058* (2021.05)

(58) Field of Classification Search
  CPC . H02M 3/33584; H02M 1/0006; H02M 3/335
  See application file for complete search history.

(56) References Cited

U.S. PATENT DOCUMENTS

| | | | | |
|---|---|---|---|---|
| 5,570,276 A | * | 10/1996 | Cuk | H02M 3/33569 |
| | | | | 363/16 |
| 6,069,804 A | * | 5/2000 | Ingman | H02M 3/33592 |
| | | | | 363/124 |
| 6,501,193 B1 | * | 12/2002 | Krugly | H02M 3/33561 |
| | | | | 307/31 |

(Continued)

FOREIGN PATENT DOCUMENTS

| | | | |
|---|---|---|---|
| DE | 102016202922 A1 | 8/2017 | |
| DE | 102014219478 B4 * | 11/2019 | ........ B60L 11/1809 |

(Continued)

*Primary Examiner* — Sisay G Tiku
(74) *Attorney, Agent, or Firm* — Harrity & Harrity, LLP

(57) ABSTRACT

A circuit for a bi-directional DC-DC converter, a bi-directional DC-DC converter and a method for operating a bi-directional DC-DC converter are disclosed. The circuit comprises: a first input terminal and a second input terminal configured to receive a DC input; a DC output terminal; a first switch and a second switch; a first control interface configured to control the first switch to be switched on and off; a second control interface configured to control the second switch to be switched on and off; a first primary winding coupled in series with the first switch between the first input terminal and a common terminal; a second primary winding coupled in series with the second switch between the second input terminal and the common terminal; and a common secondary winding with one end coupled to the DC output terminal.

26 Claims, 8 Drawing Sheets

(56) References Cited

U.S. PATENT DOCUMENTS

| | | | |
|---|---|---|---|
| 2004/0037100 A1* | 2/2004 | Orr | H02M 3/33576 |
| | | | 363/131 |
| 2016/0043623 A1* | 2/2016 | Ortiz | H02M 3/33523 |
| | | | 363/21.07 |
| 2017/0229862 A1* | 8/2017 | Mache | H02J 3/06 |
| 2022/0149744 A1* | 5/2022 | Huber | H02M 1/0095 |
| 2023/0145504 A1* | 5/2023 | Chang | H02M 1/0074 |
| | | | 363/16 |
| 2023/0246558 A1* | 8/2023 | Radic | H02M 3/01 |
| 2024/0007003 A1* | 1/2024 | Hu | H02M 3/33523 |
| 2024/0072674 A1* | 2/2024 | Saliva | H02M 1/0006 |
| 2024/0128875 A1* | 4/2024 | Bonavente | H02M 1/0006 |
| 2024/0186903 A1* | 6/2024 | Matthews | H02M 3/33523 |

FOREIGN PATENT DOCUMENTS

| | | |
|---|---|---|
| JP | H1189113 A | 3/1999 |
| KR | 20050048012 A | 5/2005 |

* cited by examiner

CIRCUIT FOR BI-DIRECTIONAL CONVERTER, BI-DIRECTIONAL CONVERTER AND OPERATION METHOD THEREOF

CROSS REFERENCE TO RELATED APPLICATION

This application claims priority to Chinese Patent Application No. 202210323640.0 filed on Mar. 30, 2022, the content of which is incorporated by reference herein in its entirety.

TECHNICAL FIELD

The present disclosure relates to the technical field of electronic circuits, and more particularly to a bi-directional direct current to direct current (DC-DC) converter.

BACKGROUND

At present, bi-directional DC-DC converters are widely applied to charging applications for an ESS (energy storage system) and an EV (electric vehicle). FIG. 1 is a schematic block diagram of such bi-directional DC-DC converters. As shown in FIG. 1, a bi-directional DC-DC converter includes a main bi-directional DC-DC topology, two grid drivers for the main bi-directional DC-DC topology, a primary side auxiliary power supply 10, a secondary side auxiliary power supply 20, and a control unit (MCU).

FIG. 2A shows circuit structures of the primary side auxiliary power supply 10 and the secondary side auxiliary power supply 20 in FIG. 1. As shown in FIG. 2A, each of the primary side auxiliary power supply 10 and the secondary side auxiliary power supply 20 includes a pair of a primary winding and a secondary winding, a transistor and a PWM (pulse width modulation) controller IC1, IC2.

When energy is transferred from the primary side to the secondary side of the bi-directional DC-DC converter, that is, in a forward mode, the primary side auxiliary power supply 10 operates and the secondary side auxiliary power supply 20 does not operate. When energy is transferred from the secondary side to the primary side of the bi-directional DC-DC converter, that is, in a reverse mode, the secondary side auxiliary power supply 20 operates and the primary side auxiliary power supply 10 does not operate.

In some cases, the primary side auxiliary power supply 10 and the secondary side auxiliary power supply 20 operate in series. In these cases, output terminals Vcc_p and Vcc_s of the two auxiliary power supplies shall be connected to an output terminal Vcc through two diodes respectively, as shown in FIG. 2B.

Such bi-directional DC-DC converter has problems of complex system and high cost.

SUMMARY

A brief overview of the present disclosure is given below in order to provide a basic understanding of certain aspects of the present disclosure. It should be understood that the overview is not an exhaustive overview about the contents of the present disclosure. The overview is not intended to determine a key or important part of the present disclosure or intended to limit the scope of the present disclosure. A purpose is only to give some concepts in a simplified form as a prelude to a more detailed description to be discussed later.

According to an aspect of the present disclosure, a circuit for a bi-directional DC-DC converter is provided. The circuit includes a first input terminal, a second input terminal, a DC output terminal, a first switch, a second switch, a first control interface, a second control interface, a first primary winding, a second primary winding, and a common secondary winding. Each of the first input terminal and the second input terminal is configured to receive a DC input. The first control interface is configured to control the first switch to be switched on and off. The second control interface is configured to control the second switch to be switched on and off. The first primary winding is coupled in series with the first switch between the first input terminal and a common terminal. The second primary winding coupled in series with the second switch between the second input terminal and the common terminal. One end of the common secondary winding is coupled to the DC output terminal.

In a preferable implementation, the circuit further includes a control unit. The control unit is powered by the DC output terminal. The control unit is configured to control the first switch to be switched on and off through the first control interface and control the second switch to be switched on and off through the second control interface.

In a preferable implementation, the first control interface further includes a first controller configured to provide a signal for controlling the first switch to be switched on and off, and the second control interface further includes a second controller configured to provide a signal for controlling the second switch to be switched on and off. The control unit is configured to provide a control signal for turning on or off the first controller and the second controller respectively.

In a preferable implementation, the circuit further includes a first diode, a second diode and a third diode. An anode of the first diode is coupled to the first input terminal, and a cathode of the first diode is coupled to one end of the first primary winding. An anode of the second diode is coupled to the second input terminal, and a cathode of the second diode is coupled to one end of the second primary winding. The third diode and the common secondary winding are coupled in series between the DC output terminal and a further common terminal.

In a preferable implementation, the circuit further includes a first resistance capacitance diode (RCD) absorption circuit. The first RCD absorption circuit includes a fourth diode, a first resistor and a first capacitor. The fourth diode is coupled between the first primary winding and the first resistor and the first capacitor that are connected in parallel.

In a preferable implementation, the circuit further includes a second RCD absorption circuit. The second RCD absorption circuit includes a fifth diode, a second resistor and a second capacitor. The fifth diode is coupled between the second primary winding and the second resistor and the second capacitor that are connected in parallel.

In a preferable implementation, for the bi-directional DC-DC converter operating in a forward mode: the first input terminal is powered on, and the first controller operates; the DC output terminal is powered on by energy received by the first input terminal and transformed by the first primary winding and the common secondary winding; the DC output terminal supplies power to the control unit, and the control unit turns off the second controller; and the bi-directional DC-DC converter operates in the forward mode. For the bi-directional DC-DC converter operating in a reverse mode: the second input terminal is powered on, and the second controller operates; the DC output terminal is powered on by energy received by the second input terminal and transformed by the second primary winding and the common secondary winding; the DC output terminal supplies power to the control unit, and the control unit turns off the first controller; and the bi-directional DC-DC converter operates in the reverse mode.

In a preferable implementation, a diameter of a copper wire of the second primary winding is equal to or less than 60% of a diameter of a copper wire of the first primary winding. For the bi-directional DC-DC converter operating in a forward mode: the first input terminal is powered on, and the first controller operates; the DC output terminal is powered on by energy received by the first input terminal and transformed by the first primary winding and the common secondary winding; the DC output terminal supplies power to the control unit, and the control unit turns off the second controller; and the bi-directional DC-DC converter operates in the forward mode. For the bi-directional DC-DC converter operating in a reverse mode: the second input terminal is powered on, and the second controller operates; the DC output terminal is powered on by energy received by the second input terminal and transformed by the second primary winding and the common secondary winding; the DC output terminal supplies power to the control unit, and the control unit turns off the first controller; the bi-directional DC-DC converter operates in the reverse mode, and the first input terminal is powered on; and the control unit enables the first controller and turns off the second controller.

In a preferable implementation, a diameter of a copper wire of the first primary winding is equal to or less than 60% of a diameter of a copper wire of the second primary winding. For the bi-directional DC-DC converter operating in a forward mode: the first input terminal is powered on, and the first controller operates; the DC output terminal is powered on by energy received by the first input terminal and transformed by the first primary winding and the common secondary winding; the DC output terminal supplies power to the control unit, and the control unit turns off the second controller; the bi-directional DC-DC converter operates in the forward mode and the second input terminal is powered on; and the control unit enables the second controller and turns off the first controller. For the bi-directional DC-DC converter operating in a reverse mode: the second input terminal is powered on, and the second controller operates; the DC output terminal is powered on by energy received by the second input terminal and transformed by the second primary winding and the common secondary winding; the DC output terminal supplies power to the control unit, and the control unit turns off the first controller; and the bi-directional DC-DC converter operates in the reverse mode.

In a preferable implementation, in a case that the first input terminal and the second input terminal are powered on simultaneously, the first controller and the second controller operate simultaneously, and the control unit is configured to determine, based on a received instruction indicating whether the bi-directional DC-DC converter operates in a forward mode or a reverse mode, whether to turn off the first controller or the second controller.

In a preferable implementation, the circuit further includes a first capacitor and a second capacitor. The first capacitor is connected in parallel with the first diode, and the second capacitor is connected in parallel with the second diode, such that the first switch and the second switch are capable of being soft-switched on or off.

In a preferable implementation, the first switch and the second switch are insulated gate bipolar transistors.

In a preferable implementation, the first input terminal and the second input terminal are respectively coupled to two ends of the bi-directional DC-DC converter.

In a preferable implementation, one end of the first primary winding is coupled to the first input terminal, the other end of the first primary winding is coupled to one end of the first switch, and the other end of the first switch is coupled to the common terminal. One end of the second primary winding is coupled to the second input terminal, the other end of the second primary winding is coupled to one end of the second switch, and the other end of the second switch is coupled to the common terminal.

According to another aspect of the present disclosure, a bi-directional DC-DC converter is provided. The bi-directional DC-DC converter includes the circuit described above and a control unit configured to enable or turn off the first controller and the second controller of the circuit.

According to a further aspect of the present disclosure, a method for operating the bi-directional DC-DC converter described above is provided. The method includes: powering on at least one of the first input terminal and the second input terminal of the circuit; powering on the DC output terminal by energy received by the first input terminal or the second input terminal and transformed by the first primary winding or the second primary winding and the common secondary winding; supplying, by the DC output terminal, power to the control unit, and turning off, by the control unit, one of the first controller and the second controller; and operating the bi-directional DC-DC converter in the forward mode or the reverse mode.

In a preferable implementation, a diameter of a copper wire of the second primary winding is equal to or less than 60% of a diameter of a copper wire of the first primary winding. The method further includes: in a case of the bi-directional DC-DC converter operating in the forward mode or the reverse mode, enabling the first controller and turning off the second controller by the control unit.

In a preferable implementation, a diameter of a copper wire of the first primary winding is equal to or less than 60% of a diameter of a copper wire of the second primary winding. The method further includes: in a case of the bi-directional DC-DC converter operating in the forward mode or the reverse mode, enabling the second controller and turning off the first controller by the control unit.

In a preferable implementation, the method further includes, in a case that the first input terminal and the second input terminal are powered on simultaneously: powering on the DC output terminal by energy received by the first input terminal and the second input terminal and transformed by the first primary winding, the second primary winding and the common secondary winding; supplying power to the control unit by the DC output terminal, and determining, by the control unit, whether to turn off the first controller or the second controller based on a received instruction indicating whether the bi-directional DC-DC converter operates in the forward mode or the reverse mode; and operating the bi-directional DC-DC converter in the forward mode or the reverse mode.

With the circuit for a bi-directional DC-DC converter according to the present disclosure, power density is increased, and a size and a weight of the system are reduced due to reduction of the number of components, thereby reducing a cost.

These and other advantages of the present disclosure will be more obvious through the following detailed description of the preferred implementations of the present disclosure in combination with the drawings.

BRIEF DESCRIPTION OF THE DRAWINGS

To further set forth the above and other advantages and features of the present disclosure, detailed description of the implementations of the present disclosure will be made in the following in conjunction with the drawings. The drawings, together with the detailed description below, are incorporated into and form a part of the specification. Elements with the same functions and structures are indicated by the same reference mark. It should be understood that the drawings only illustrate typical implementations of the present disclosure and should not be construed as a limitation to the scope of the present disclosure. In the drawings.

DETAILED DESCRIPTION

Figure 1:
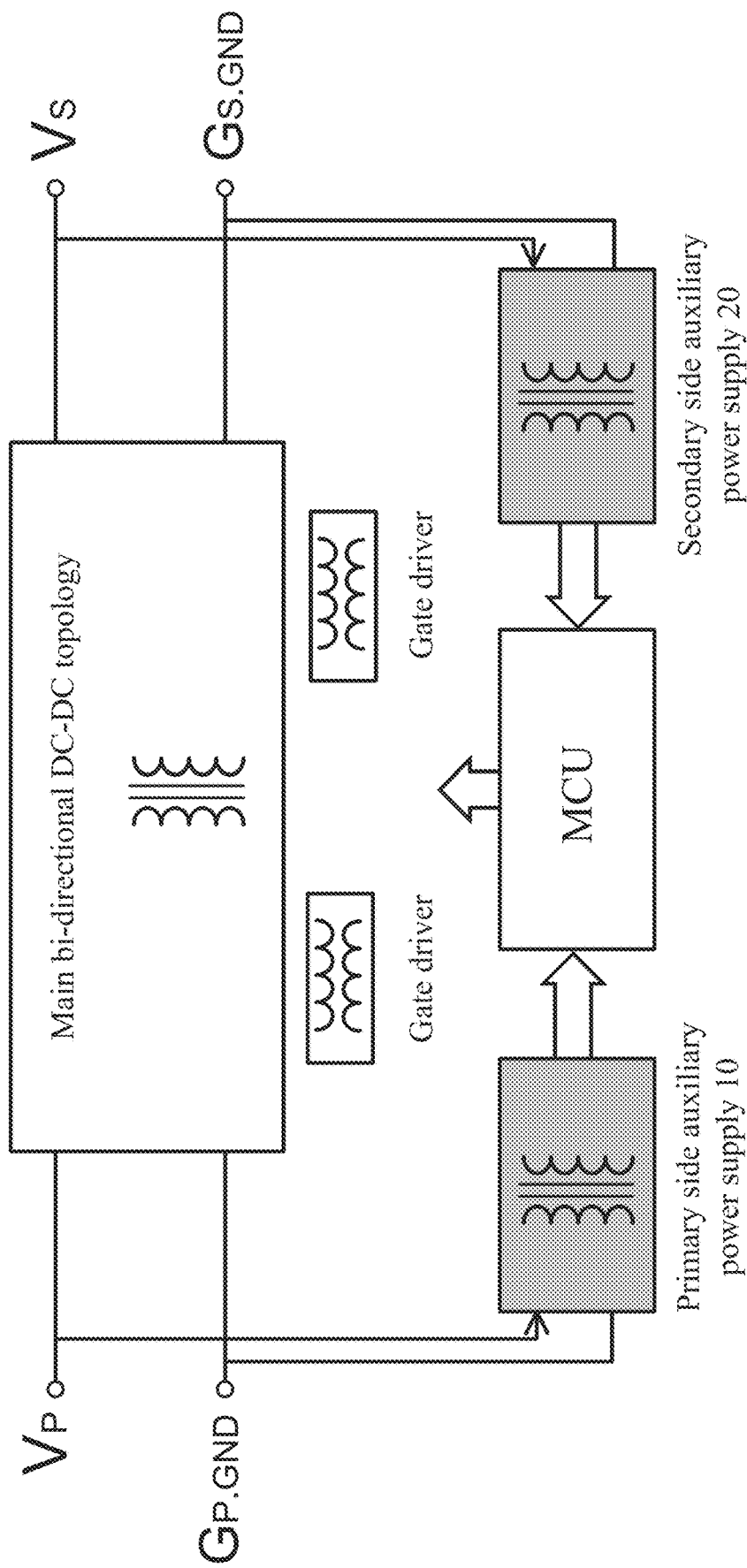
FIG. 1 is a block diagram of a conventional bi-directional DC-DC converter.
Figure 2A:
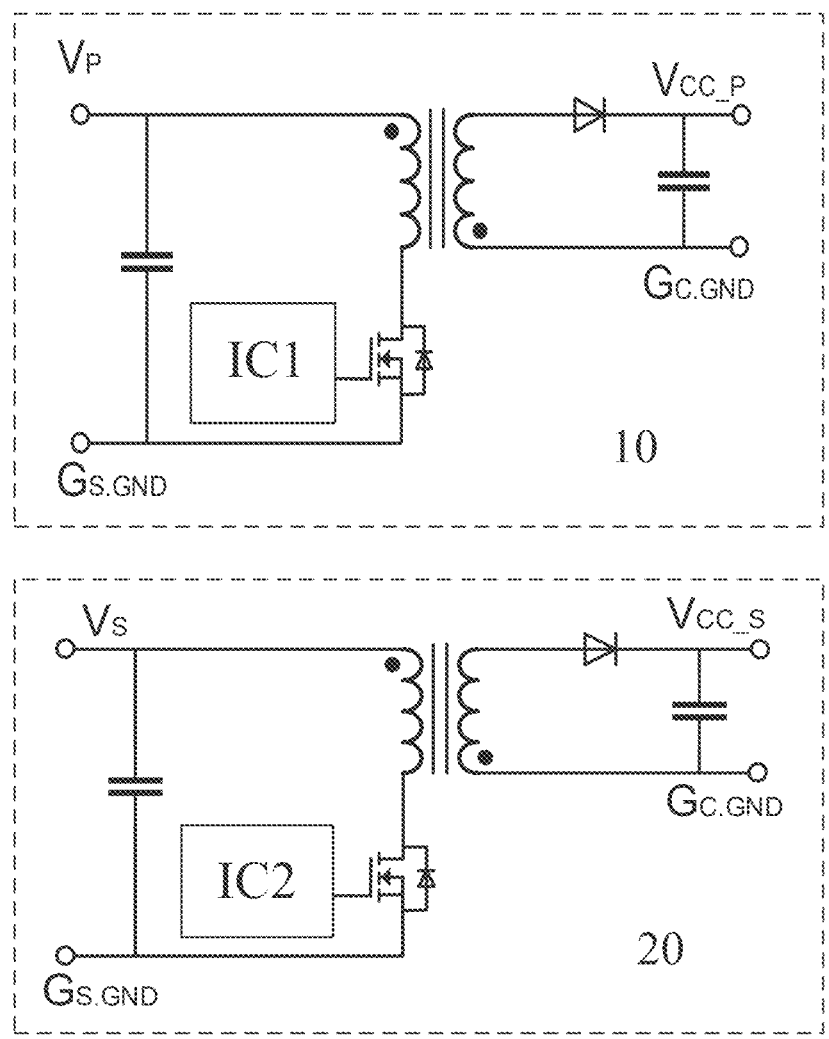
FIG. 2A shows circuit structures of a primary side auxiliary power supply and a secondary side auxiliary power supply in FIG. 1.
Figure 2B:
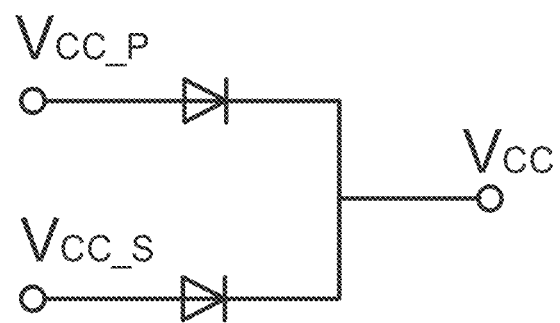
FIG. 2B shows connections of respective output terminals of the primary side auxiliary power supply and of the secondary side auxiliary power supply in FIG. 1 in a case that the primary side auxiliary power supply and the secondary side auxiliary power supply operate in series.

Example implementations of the present disclosure are described below in conjunction with the drawings. For conciseness and clarity, not all features of an actual implementation are described in this specification. However, it should be understood that numerous implementation-specific decisions, for example, in accord with constraining conditions related to system and business, should be made when developing any of such actual implementations, so as to achieve specific targets of a developer. These constraining conditions may vary with different implementations. Furthermore, it should be understood that although development work may be complicated and time-consuming, for those skilled in the art benefiting from the present disclosure, such development work is only a routine task.

Here, it should further be noted that in order to avoid obscuring the present disclosure due to unnecessary details, only a device structure and/or processing step closely related to the solutions according to the present disclosure are illustrated in the drawings, and other details less related to the present disclosure are omitted.

Figure 3:
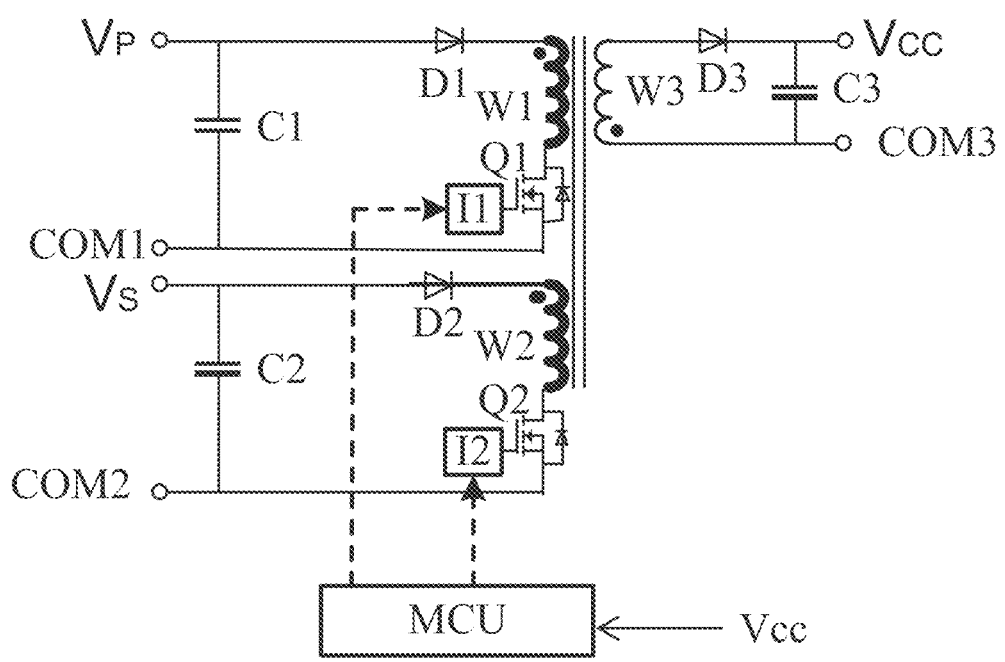
FIG. 3 shows a circuit for a bi-directional DC-DC converter according to an implementation of the present disclosure.

FIG. 3 shows a circuit 30 for a bi-directional DC-DC converter according to an implementation of the present disclosure.

As shown in FIG. 3, the circuit 30 includes two primary windings W1 and W2, a common secondary winding W3, input terminals Vp and Vs each configured to receive a DC input, a DC output terminal Vcc, transistors Q1 and Q2, control interfaces I1 and I2, common terminals COM1, COM2, COM3, capacitors C1, C2, and C3, and diodes D1, D2 and D3.

One end of the primary winding W1 is connected to a cathode of the diode D1, and the input terminal Vp is connected to an anode of diode D1. The other end of the primary winding W1 is connected to a collector of the transistor Q1, and an emitter of the transistor Q1 is connected to the common terminal COM1. A gate of the transistor Q1 is connected to the control interface I1.

It should be noted that the diode D1 may be reversely connected between the transistor Q1 and the common terminal COM1. In this case, the transistor Q1 is driven in a suspension driving way. The diode D2 may be set similarly.

Those skilled in the art should understand that all conventional devices having a switching function, such as an IGBT, a MOSFET, and a GaN triode, may be used as the transistors Q1 and Q2.

Those skilled in the art should also understand that diodes D1, D2 and D3 may be replaced with other types of switching devices, such as MOSFETs.

One end of the primary winding W2 is connected to a cathode of diode D2, and the input terminal Vs is connected to an anode of the diode D2. The other end of the primary winding W2 is connected to a collector of the transistor Q2, and an emitter of the transistor Q2 is connected to the common terminal COM2. A gate of the transistor Q2 is connected to the control interface I2.

One end of the secondary winding W3 is connected to an anode of the diode D3, and a cathode of the diode D3 is connected to the output terminal Vcc. The other end of the secondary winding W3 is connected to the common terminal COM3.

The circuit 30 further includes a control unit MCU. The MCU is powered by the output terminal Vcc, and controls the transistors Q1 and Q2 to be switched on or off through the control interfaces I1 and I2 respectively.

Optionally, the transistor Q1 may be arranged so that the collector of the transistor Q1 is coupled to the cathode of the diode D1 and the emitter of the transistor Q1 is coupled to the primary winding W1.

Optionally, the transistor Q2 may be arranged so that the collector of the transistor Q2 is coupled to the cathode of the diode D2 and the emitter of the transistor Q2 is coupled to the primary winding W2.

Optionally, the diode D3 may be reversely connected between the common terminal COM3 and the secondary winding W3.

It should be noted that the input terminals Vp and Vs are respectively coupled to two ends of the bi-directional DC-DC converter.

Figure 4:
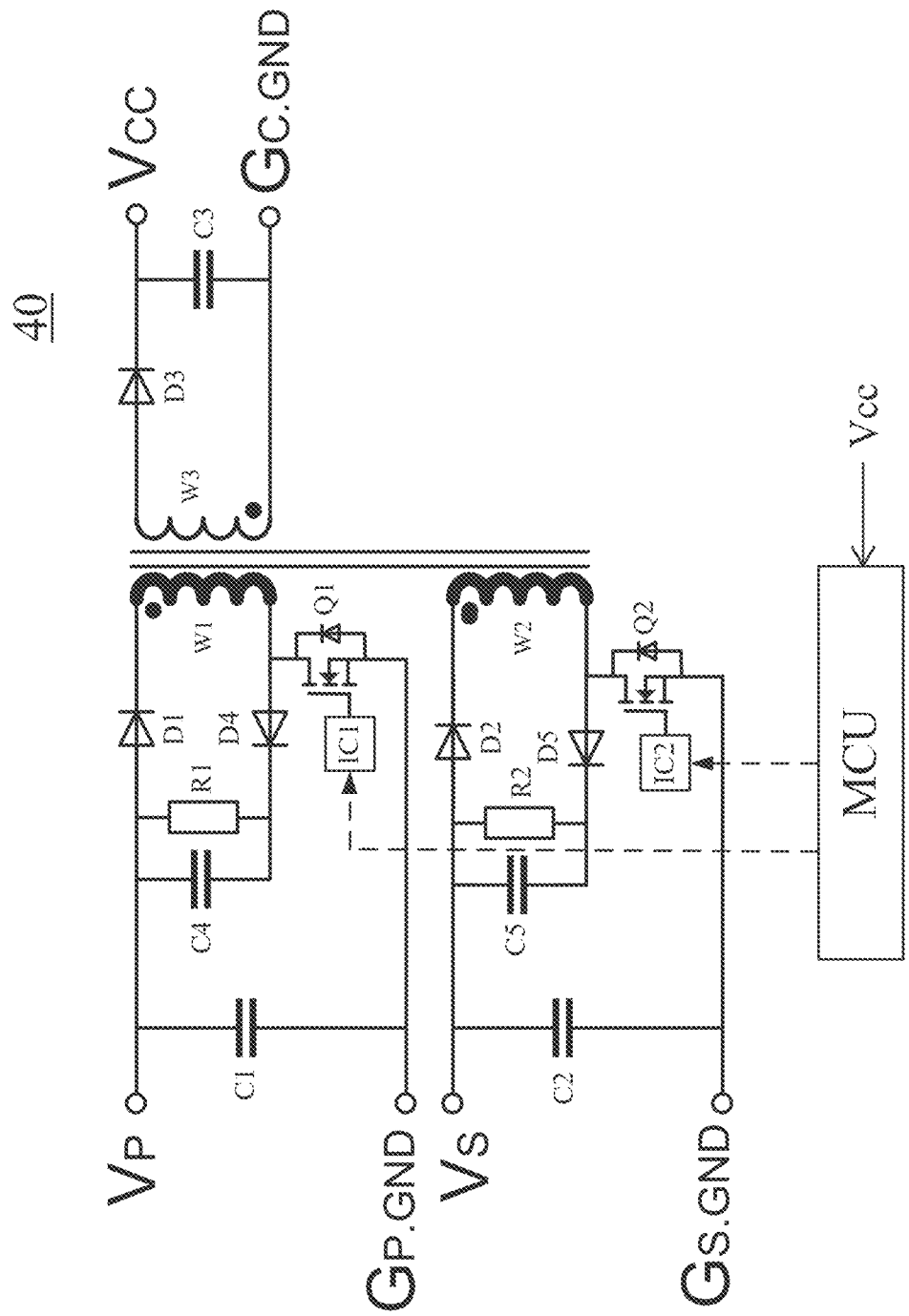
FIG. 4 shows a circuit for a bi-directional DC-DC converter according to a preferred implementation of the present disclosure.

FIG. 4 shows a circuit 40 for a bi-directional DC-DC converter according to a preferable implementation of the present disclosure. The circuit 40 in FIG. 4 is substantially the same as the circuit 30 in FIG. 3, except that the control interfaces I1 and I2 in FIG. 3 are respectively replaced with controllers IC1 and IC2 in FIG. 4, the common terminals COM1, COM2 and COM3 in FIG. 3 are respectively replaced with grounding terminals Gp.GND, Gs.GND, Gc.GND in FIG. 4, and the circuit in FIG. 4 further includes two RCD absorption circuits.

In a preferable implementation, the controllers IC1 and IC2 may be, for example, PWM (pulse width modulation) chips, such as ICE5QSAG of Infineon.

In a preferable implementation, the three ground terminals Gp.GND, Gs.GND and Gc.GND of the circuit 40 are not common ground. However, the present disclosure is not limited to this, and the ground terminals Gp.GND, Gs.GND and Gc.GND may be common ground.

It should also be understood that although the terminals Gp.GND, Gs.GND and Gc.GND in FIG. 4 are connected to ground, the present disclosure is not limited to this, and the terminals Gp.GND, Gs.GND and Gc.GND may be connected to any other suitable low potentials.

A first RCD absorption circuit in circuit 40 includes a resistor R1, a capacitor C4 and a diode D4. An anode of the diode D4 is connected to a collector of the transistor Q1. The resistor R1 and the capacitor C4 are connected in parallel between a cathode of the diode D4 and the input terminal Vp.

A second RCD absorption circuit in circuit 40 includes a resistor R2, a capacitor C5 and a diode D5. An anode of the diode D5 is connected to a collector of the transistor Q2. The resistor R2 and the capacitor C5 are connected in parallel between a cathode of the diode D5 and the input terminal Vs.

The controllers IC1 and IC2 in the circuit 40, when being enabled, respectively provide the transistors Q1 and Q2 with, for example, PWM (pulse width modulation) signals, so as to control switching on or off of the transistors Q1 and Q2 respectively. The control unit MCU provides the controllers IC1 and IC2 respectively with control signals such that the controllers IC1 and IC2 switch on or off the transistors Q1 and Q2 respectively. Optionally, the control signals may be enable signals for enabling the controllers IC1 and IC2 to operate or hibernate.

The first RCD absorption circuit and the second RCD absorption circuit in the circuit 40 alleviate peak currents of the transistors Q1 and Q2, thereby improving performance of the whole system.

Operation processes of the bi-directional DC-DC converter in a forward mode and in a reverse mode are described below in combination with FIG. 5A and FIG. 5B.

Figure 5A:
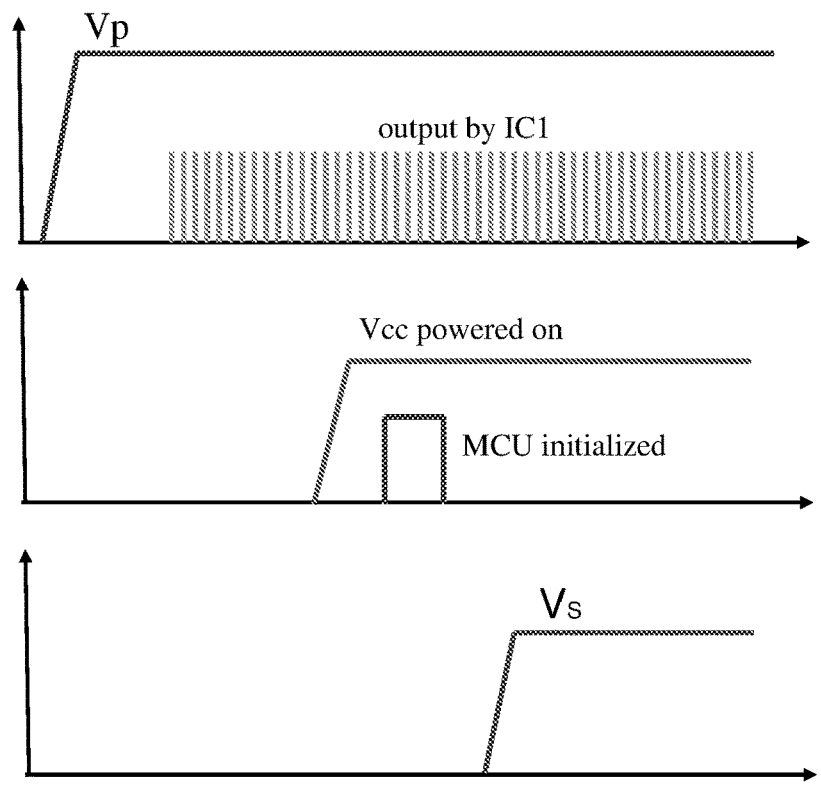
FIG. 5A and FIG. 5B show, respectively, voltage waveforms of input terminals Vs and Vp and a DC output terminal Vcc of the circuit in FIG. 4, which configure the bi-directional DC-DC converter to operate in a forward mode and in a reverse mode, respectively.

Referring to FIG. 5A, in order to enable the bi-directional DC-DC converter to operate in the forward mode, the input terminal Vp of the circuit 40 is powered on to turn on the controller IC1 and switch on the transistor Q1. For example, the controller IC1 may be turned on by detecting a voltage at Vp. Then, the output terminal Vcc is powered on by energy received by the input terminal Vp and transformed by the primary winding W1 and the common secondary winding W3, so that the output terminal Vcc supplies power to the control unit MCU to turn on or initialize the control unit MCU and turn off the controller IC2. In this way, the bi-directional DC-DC converter operates in the forward mode.

Those skilled in the art should understand that the initialization of the control unit MCU may be enabled by powering on the output terminal Vcc. However, not every time the output terminal Vcc is powered on, the control unit MCU is initialized. In some cases, after the control unit MCU is initialized once, the whole system switches between the forward mode and the reverse mode repeatedly, and the subsequent switching does not require initialization of the control unit MCU. Therefore, the step of initializing the control unit MCU is optional, and may also be performed during other stages. In this case, the control unit MCU turns off the controller IC2 depending on voltage at Vcc or based on other control signal.

It should be understood that after the output terminal Vcc is powered on, the input terminal Vs may also possibly be powered on due to the transformation of energy through the common secondary winding W3 and the primary winding W2. In this case, the primary winding W2 does not operate since the controller IC2 or the control interface 12 is turned off at this time.

Figure 5B:
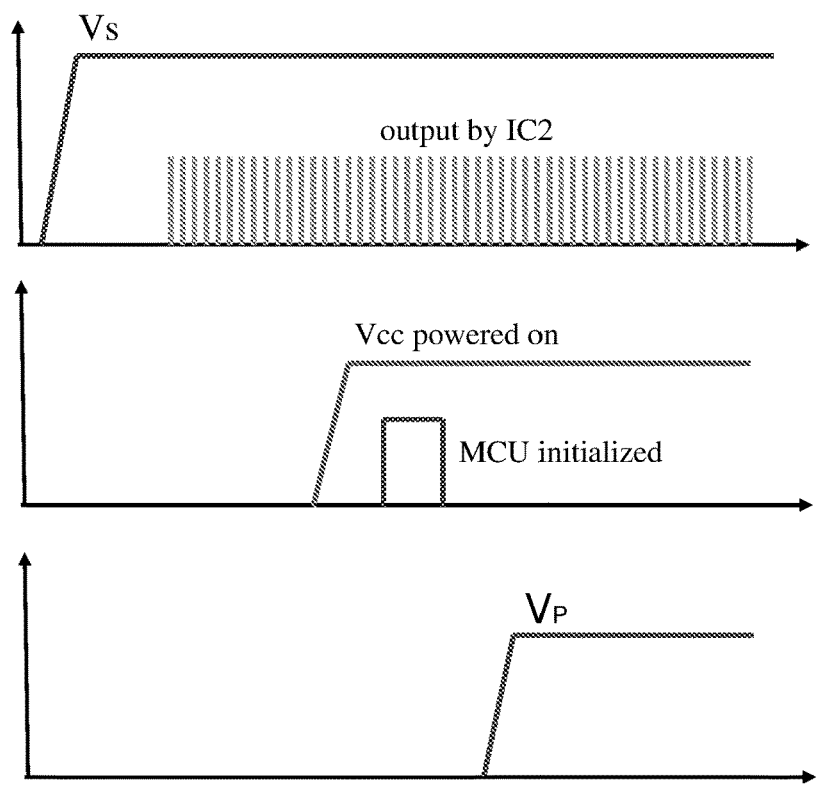

Referring to FIG. 5B, in order to enable the bi-directional DC-DC converter to operate in the reverse mode, the input terminal Vs of the circuit 40 is powered on such that the controller IC2 is turned on and the transistor Q2 is switched on. Then, the output terminal Vcc is powered on by energy received by the input terminal Vs and transformed by the primary winding W2 and the common secondary winding W3, so that the control unit MCU is turned on or initialized. Subsequently, the control unit MCU turns off the controller IC1, and the bi-directional DC-DC converter operates in the reverse mode.

It should be understood that after the output terminal Vcc is powered on, the input terminal Vp is also powered on due to the transformation of energy through the common secondary winding W3 and primary winding W1.

According to a variant, in order to further save cost, especially the cost of windings, a diameter of a copper wire of the primary winding W2 may be less than a diameter of a copper wire of the primary winding W1. For example, the diameter of the copper wire of W2 is equal to or less than 60% of the diameter of the copper wire of W1. Based on this advantage, the primary winding W1 may be controlled to operate as a main winding in both the forward mode and the reverse mode, so that the primary winding W2 may be a thin winding. Operation processes of the bi-directional DC-DC converter in the forward mode and in the reverse mode according to the variant are described below in combination with FIG. 6A and FIG. 6B.

Figure 6A:
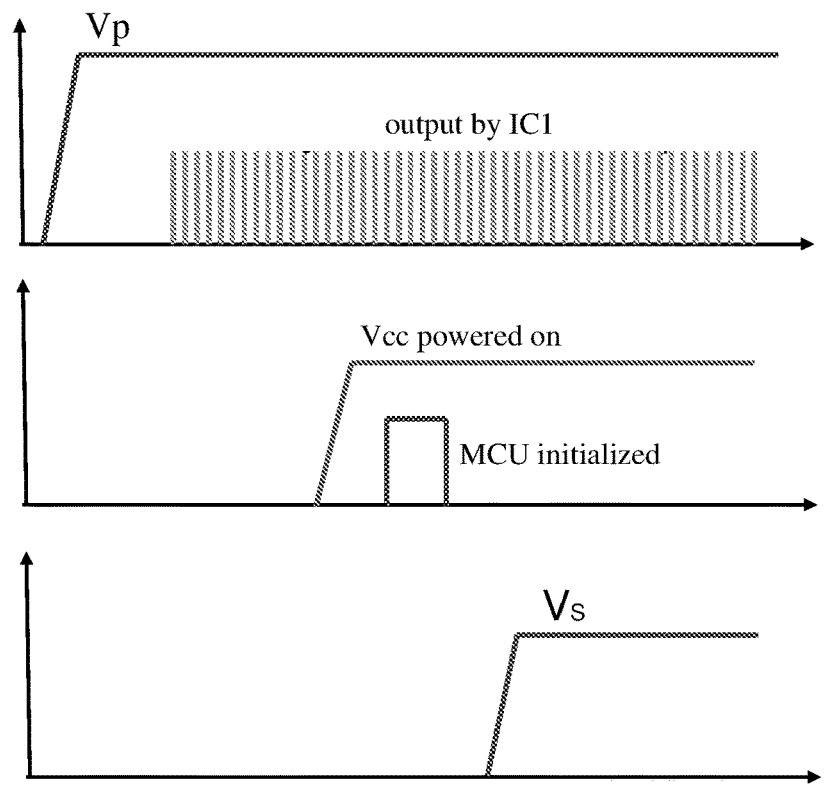
FIG. 6A and FIG. 6B show, respectively, voltage waveforms of input terminals Vs and Vp and a DC output terminal Vcc according to a variant of the circuit of FIG. 4, which configure the bi-directional DC-DC converter to operate in a forward mode and in a reverse mode.

Referring to FIG. 6A, in order to enable the bi-directional DC-DC converter to operate in the forward mode, the input terminal Vp is powered on, so that the controller IC1 is turned on and the transistor Q1 is switched on. Then, the output terminal Vcc is powered on by energy received by the input terminal Vp and transformed by the primary winding W1 and the common secondary winding W3, so that the control unit MCU is turned on or initialized. The control unit MCU turns off the controller IC2, and the bi-directional DC-DC converter operates in the forward mode. In this case, the primary winding W1 operates, while the primary winding W2 does not operate.

It should be understood that after the output terminal Vcc is powered on, the input terminal Vs is also powered on due to the transformation of energy through the common secondary winding W3 and primary winding W2.

Figure 6B:
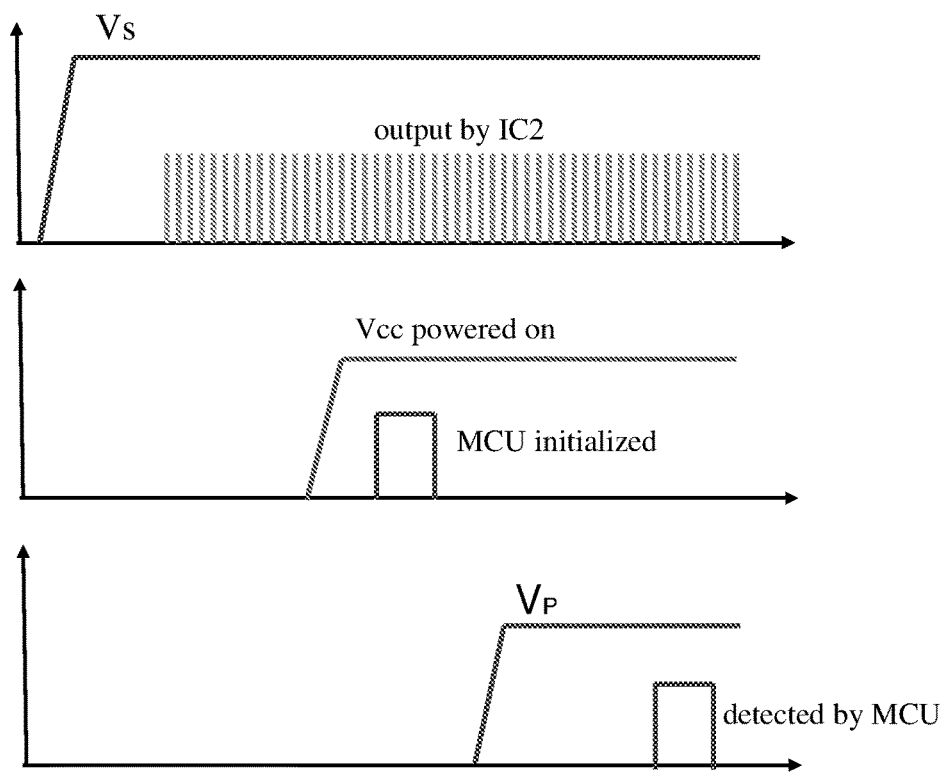

Referring to FIG. 6B, in order to enable the bi-directional DC-DC converter to operate in the reverse mode, the input terminal Vs is powered on, so that the controller IC2 is turned on and the transistor Q2 is switched on. Then, the output terminal Vcc is powered on by energy received by the input terminal Vs and transformed by the primary winding W2 and the common secondary winding W3, so that the control unit MCU is turned on or initialized. The control unit MCU turns off the controller IC1, and the bi-directional DC-DC converter operates in the reverse mode. Next, the input terminal Vp is powered on due to operation of the bi-directional DC-DC converter. The control unit MCU turns on the controller IC1 and turns off the controller IC2 when detecting that the input terminal Vp is powered on, so that the current mainly flows through the primary winding W1 instead of the primary winding W2. The output terminal Vcc is powered on due to current flowing through the primary winding W1, thus supplying power to the control unit MCU. In this way, the copper wires of the primary winding W2 is unnecessarily as thick as the copper wires of the primary winding W1.

Optionally, the diameter of the copper wire of the primary winding W1 may be less than the diameter of the copper wire of the primary winding W2. For example, the diameter of the copper wire of W1 is equal to or less than 60% of the diameter of the copper wire of W2. In this case, the primary winding W2 operates in both the forward mode and the reverse mode. Operation processes of the bi-directional DC-DC converter in the forward mode and in the reverse mode are as follows.

In order to enable the bi-directional DC-DC converter to operate in the forward mode, the input terminal Vp is powered on, so that the controller IC1 is turned on and the transistor Q1 is switched on. Then, the output terminal Vcc is powered on by energy received by the input terminal Vp and transformed by the primary winding W1 and the common secondary winding W3, thus supplying power to the control unit MCU to turn on or initialize the control unit MCU. The control unit MCU turns off the controller IC2, and the bi-directional DC-DC converter operates in the forward mode. Next, the input terminal Vs is powered on due to energy passing through the bi-directional DC-DC converter. Finally, the control unit MCU enables the controller IC2 and turns off the controller IC1, so that the primary winding W2 operates in the forward mode.

In order to enable the bi-directional DC-DC converter to operate in the reverse mode, the input terminal Vs is powered on to so that the controller IC2 is turned on and the transistor Q2 is switched on. Then, the output terminal Vcc is powered on by energy received by the input terminal Vs and transformed by the primary winding W2 and the common secondary winding W3, such that the control unit MCU is turned on or initialized. The control unit MCU turns off the controller IC1, and the bi-directional DC-DC converter operates in the reverse mode.

It should be noted that in a case of powering on the input terminal Vp and the input terminal Vs simultaneously, the controller IC1 and the controller IC2 are turned on simultaneously. In this case, the control unit MCU determines, based on a received instruction indicating whether the bi-directional DC-DC converter operates in the forward mode or in the reverse mode, whether to turn off the controller IC1 or the controller IC2. The instruction indicating whether the bi-directional DC-DC converter operates in the forward mode or in the reverse mode may be, for example, a manual instruction.

Figure 7:
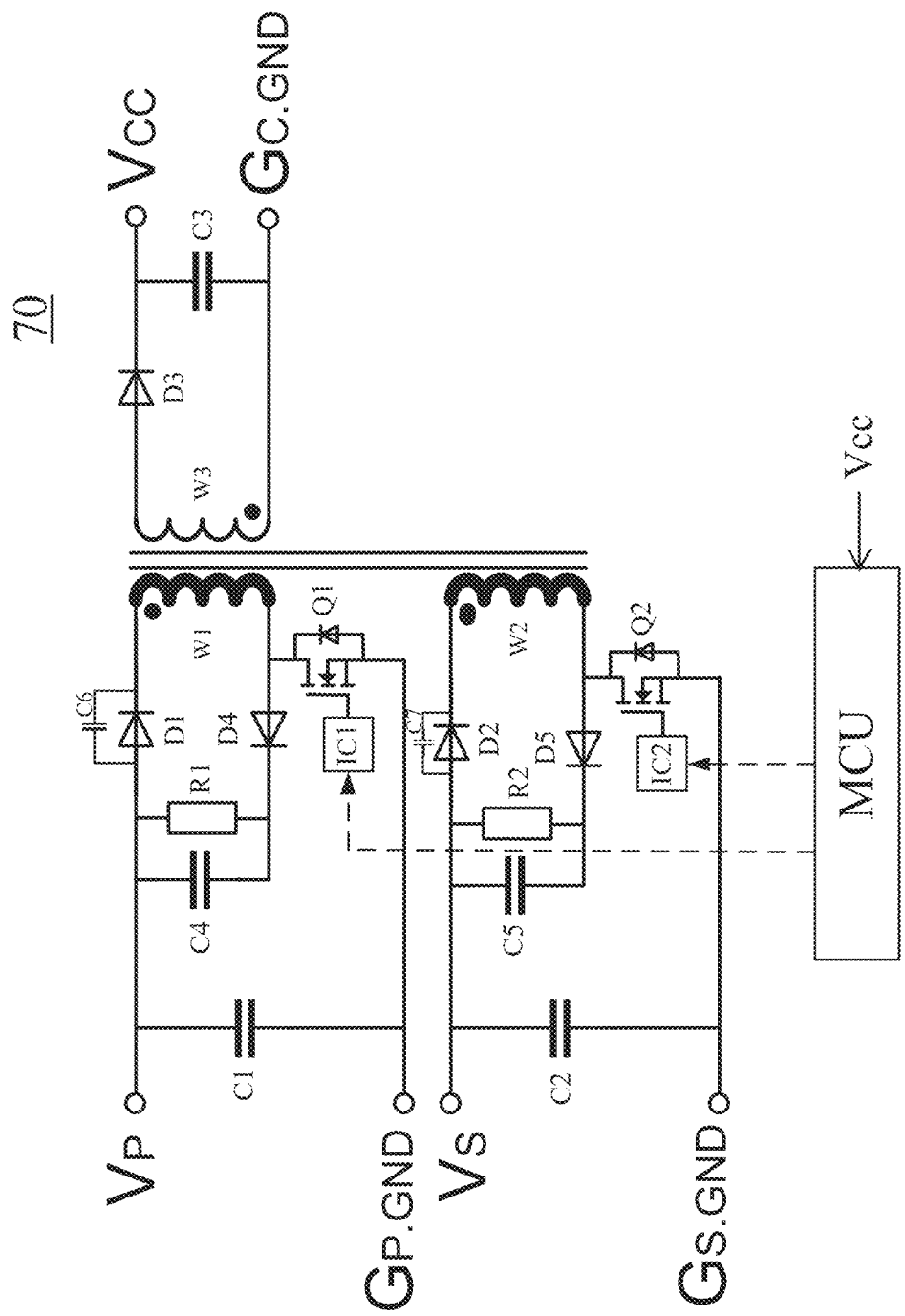
FIG. 7 shows a circuit for a bi-directional DC-DC converter according to another implementation of the present disclosure.

FIG. 7 shows a circuit 70 for a bi-directional DC-DC converter according to another implementation of the present disclosure. The circuit 70 in FIG. 7 is substantially the same as the circuit 40 in FIG. 4, in addition to a capacitor C6 connected in parallel with the diode D1 and a capacitor C7 connected in parallel with the diode D2.

By adding the capacitor C6 connected in parallel with the diode D1 and the capacitor C7 connected in parallel with the diode D2, the controller IC1 and the controller IC2 operate in a soft switching mode or a quasi-resonant mode, so that the transistor Q1 and the transistor Q2 can achieve a soft switching.

With the circuit for a bi-directional DC-DC converter according to the implementations of the present disclosure, power density is increased. In addition, a size and a weight of the system are reduced due to reduction of the number of components, thereby reducing a cost.

It should be noted that although transistors in the drawings are shown as metal oxide semiconductor field effect transistors (MOSFETs), the present disclosure is not limited to this, and other types of transistor that can realize the same function are also applicable, such as but not limited to an insulated gate bipolar transistor (IGBT), a field effect transistor (FET), a junction field effect transistor (JFET), and a double gate MOSFET.

Figure 8:
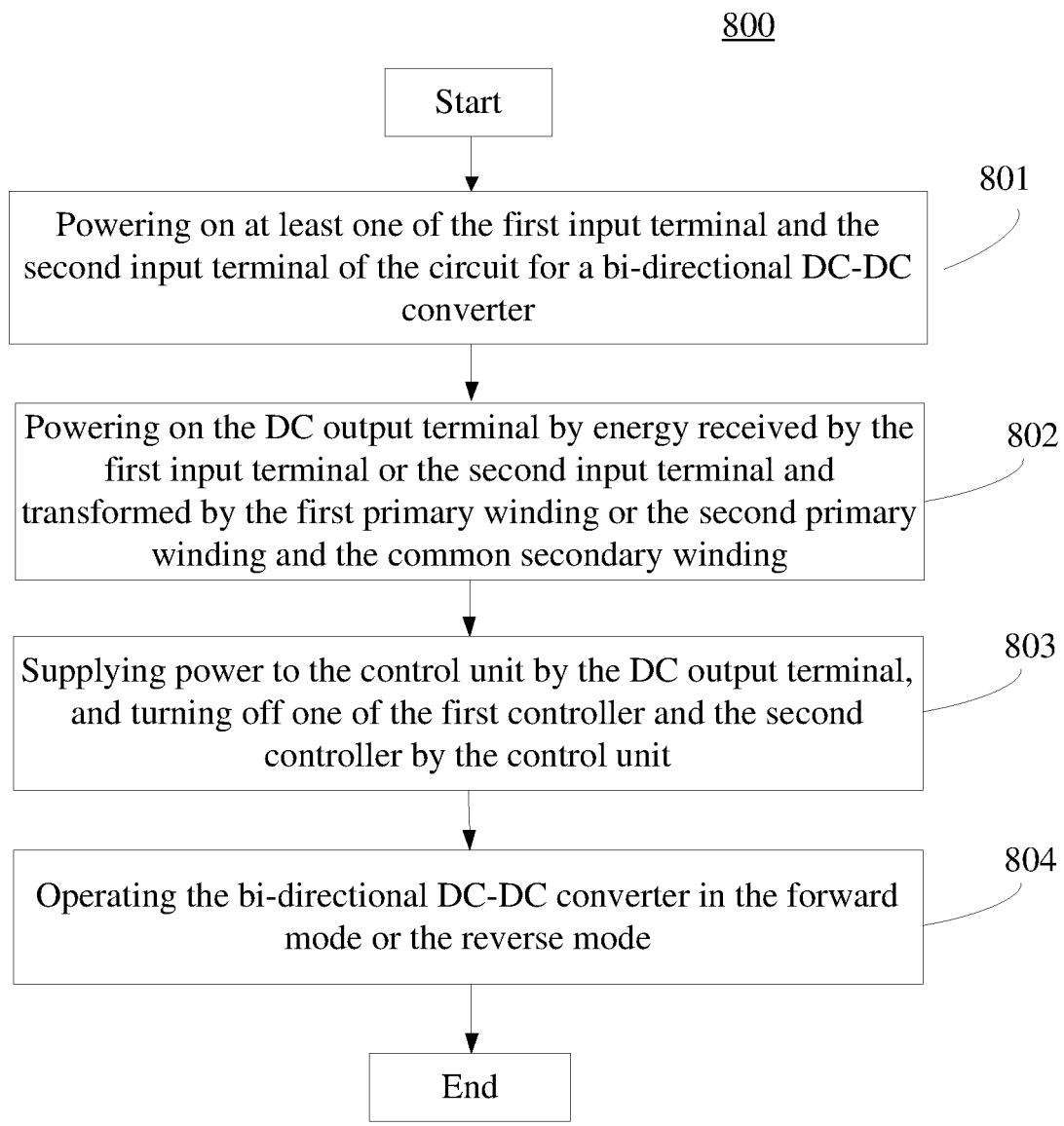
FIG. 8 is a flowchart of a method for operating a bi-directional DC-DC converter according to an implementation of the present disclosure.

FIG. 8 is a flowchart of a method 800 for operating a bi-directional DC-DC converter according to an implementation of the present disclosure.

It should be noted that the method 800 in FIG. 8 may be performed by using the circuits according to implementations of the present disclosure. The method 800 for operating a bi-directional DC-DC converter in FIG. 8 is described below in conjunction with the circuit 40 in FIG. 4.

First, in step 801, at least one of the first input terminal and the second input terminal of the circuit for a bi-directional DC-DC converter is powered on. Specifically, in this implementation, in order to enable the bi-directional DC-DC converter to operate in the forward mode, the input terminal Vp of the circuit 40 is powered on, so that the controller IC1 is turned on and the transistor Q1 is switched on. In order to enable the bi-directional DC-DC converter to operate in the reverse mode, the input terminal Vs of the circuit 40 is powered on, so that the controller IC2 is turned on and the transistor Q2 is switched on.

Next, in step 802, the DC output terminal is powered on by energy received by the first input terminal or the second input terminal and transformed by the first primary winding or the second primary winding and the common secondary winding. Specifically, in this implementation, in a case that the bi-directional DC-DC converter operates in the forward mode, the DC output terminal Vcc is powered on by energy received by the input terminal Vp of the circuit 40 and transformed by the primary winding W1 and the common secondary winding W3. In a case that the bi-directional DC-DC converter operates in the reverse mode, the output terminal Vcc is powered on by energy received by the input terminal Vs of the circuit 40 and transformed by the primary winding W2 and the common secondary winding W3.

Next, in step 803, the DC output terminal supplies power to the control unit, and the control unit turns off one of the first controller and the second controller. Specifically, in this implementation, in a case that the bi-directional DC-DC converter operates in the forward mode, the output terminal Vcc supplies power to the control unit MCU, so that the control unit MCU is turned on or initialized, and the controller IC2 is turned off. In a case that the bi-directional DC-DC converter operates in the reverse mode, the control unit MCU is turned on or initialized, and the controller IC1 is turned off.

Finally, in step 804, the bi-directional DC-DC converter operates in the forward mode or in the reverse mode.

According to a variant, the diameter of the copper wire of the primary winding W2 may be less than the diameter of the copper wire of the primary winding W1. For example, the diameter of the copper wire of W2 is equal to or less than 60% of the diameter of the copper wire of W1. In this case, the method 800 further comprises that in a case of the DC-DC converter operating in the reverse mode, the control unit MCU enables the controller IC1 and turns off the controller IC2, such that the primary winding W1 operates in the reverse mode.

Optionally, the diameter of the copper wire of the primary winding W1 may be less than the diameter of the copper wire of the primary winding W2. For example, the diameter of the copper wire of W1 is equal to or less than 60% of the diameter of the copper wire of W2. In this case, the method 800 further comprises that in a case of the DC-DC converter operating in the forward mode, the control unit MCU enables the controller IC2 and turns off the controller IC1, such that the primary winding W2 operates in the forward mode.

Preferably, the method 800 further comprises that in a case of powering on the input terminal Vp and the input terminal Vs simultaneously, the control unit MCU determines, based on a received instruction indicating whether the bi-directional DC-DC converter operates in the forward mode or the reverse mode, whether to turn off the controller IC1 or the controller IC2. The instruction indicating whether the bi-directional DC-DC converter operates in the forward mode or the reverse mode may be, for example, a manual instruction.

It should be noted that terms of "include", "comprise" or any other variants are intended to be non-exclusive. Therefore, a process, a method, an article or a device including multiple elements includes not only the elements but also other elements that are not enumerated, or also include the elements inherent for the process, the method, the article or the device. Unless expressively limited otherwise, the statement "comprising one . . . " does not exclude the case that other similar elements may exist in the process, the method, the article or the device.

It should also be noted that in the described implementations, any direct electrical connection or coupling between elements, i.e, connection or coupling without an intermediate element may be replaced by indirect connection or coupling, i.e, connection or coupling including one or more additional intermediate elements, and vice versa, as long as a general purpose of connection or coupling such as providing some signal, some information or some control is basically maintained. In other words, as long as the general purpose and function of the connection or coupling remain basically unchanged, the connection and coupling may be modified.

Aspects

At least some implementations are defined by the following aspects.

Aspect 1. A circuit for a bi-directional DC-DC converter, including:
- a first input terminal (Vp) and a second input terminal (Vs) each configured to receive a DC input;
- a DC output terminal (Vcc);
- a first switch (Q1) and a second switch (Q2);
- a first control interface configured to control the first switch to be switched on and off;
- a second control interface configured to control the second switch to be switched on and off;
- a first primary winding coupled in series with the first switch between the first input terminal and a common terminal;
- a second primary winding coupled in series with the second switch between the second input terminal and the common terminal; and
- a common secondary winding with one end coupled to the DC output terminal.

Aspect 2. The circuit according to Aspect 1, further including a control unit (MCU) powered by the DC output terminal and configured to control the first switch to be switched on and off through the first control interface and control the second switch to be switched on and off through the second control interface.

Aspect 3. The circuit according to Aspect 2, wherein the first control interface further includes a first controller (IC1) configured to provide a signal for controlling the first switch to be switched on and off, and the second control interface further includes a second controller (IC2) configured to provide a signal for controlling the second switch to be switched on and off, and
wherein the control unit is configured to provide a control signal for turning on or off the first controller and the second controller respectively.

Aspect 4. The circuit according to Aspect 2, further including a first diode, a second diode and a third diode, wherein:
- an anode of the first diode is coupled to the first input terminal, and a cathode of the first diode is coupled to one end of the first primary winding;
- an anode of the second diode is coupled to the second input terminal, and a cathode of the second diode is coupled to one end of the second primary winding; and
- the third diode and the common secondary winding are coupled in series between the DC output terminal and a further common terminal.

Aspect 5. The circuit according to Aspect 4, further including a first RCD absorption circuit.

Aspect 6. The circuit according to Aspect 5, wherein the first RCD absorption circuit includes a fourth diode, a first resistor and a first capacitor, and wherein the fourth diode is coupled between the first primary winding and the first resistor and the first capacitor that are connected in parallel.

Aspect 7. The circuit according to Aspect 4, further including a second RCD ab sorption circuit.

Aspect 8. The circuit according to Aspect 7, wherein the second RCD absorption circuit includes a fifth diode, a second resistor and a second capacitor, and wherein the fifth diode is coupled between the second primary winding and the second resistor and the second capacitor that are connected in parallel.

Aspect 9. The circuit according to any one of Aspects 3 to 8, wherein
for the bi-directional DC-DC converter operating in a forward mode:
- the first input terminal is powered on, and the first controller operates;
- the DC output terminal is powered on by energy received by the first input terminal and transformed by the first primary winding and the common secondary winding,
- the DC output terminal supplies power to the control unit, and the control unit turns off the second controller, and
- the bi-directional DC-DC converter operates in the forward mode; and for the bi-directional DC-DC converter operating in a reverse mode:
- the second input terminal is powered on, and the second controller operates;
- the DC output terminal is powered on by energy received by the second input terminal and transformed by the second primary winding and the common secondary winding, the DC output terminal supplies power to the control unit, and the control unit turns off the first controller, and the bi-directional DC-DC converter operates in the reverse mode.

Aspect 10. The circuit according to any one of Aspects 3 to 8, wherein a diameter of a copper wire of the second primary winding is equal to or less than 60% of a diameter of a copper wire of the first primary winding.

Aspect 11. The circuit according to Aspect 10, wherein for the bi-directional DC-DC converter operating in a forward mode:
the first input terminal is powered on, and the first controller operates,
the DC output terminal is powered on by energy received by the first input terminal and transformed by the first primary winding and the common secondary winding,
the DC output terminal supplies power to the control unit, and the control unit turns off the second controller, and
the bi-directional DC-DC converter operates in the forward mode; and for the bi-directional DC-DC converter operating in a reverse mode:
the second input terminal is powered on, and the second controller operates,
the DC output terminal is powered on by energy received by the second input terminal and transformed by the second primary winding and the common secondary winding,
the DC output terminal supplies power to the control unit, and the control unit turns off the first controller,
the bi-directional DC-DC converter operates in the reverse mode, and the first input terminal is powered on, and
the control unit enables the first controller and turns off the second controller.

Aspect 12. The circuit according to any one of Aspects 3 to 8, wherein a diameter of a copper wire of the first primary winding is equal to or less than 60% of a diameter of a copper wire of the second primary winding.

Aspect 13. The circuit according to Aspect 12, wherein for the bi-directional DC-DC converter operating in a forward mode:
the first input terminal is powered on, and the first controller operates,
the DC output terminal is powered on by energy received by the first input terminal and transformed by the first primary winding and the common secondary winding,
the DC output terminal supplies power to the control unit, and the control unit turns off the second controller,
the bi-directional DC-DC converter operates in the forward mode, and the second input terminal is powered on, and
the control unit enables the second controller and turns off the first controller; and for the bi-directional DC-DC converter operating in a reverse mode:
the second input terminal is powered on, and the second controller operates,
the DC output terminal is powered on by energy received by the second input terminal and transformed by the second primary winding and the common secondary winding,
the DC output terminal supplies power to the control unit, and the control unit turns off the first controller, and
the bi-directional DC-DC converter operates in the reverse mode.

Aspect 14. The circuit according to any one of Aspects 3 to 8, wherein in a case that the first input terminal and the second input terminal are powered on simultaneously, the first controller and the second controller operate simultaneously, and wherein the control unit is configured to determine, based on a received instruction indicating whether the bi-directional DC-DC converter operates in a forward mode or a reverse mode, whether to turn off the first controller or the second controller.

Aspect 15. The circuit according to any one of Aspects 4 to 8, further including a first capacitor and a second capacitor, wherein the first capacitor is connected in parallel with the first diode, and the second capacitor is connected in parallel with the second diode, such that the first switch and the second switch are capable of being soft-switched on or off.

Aspect 16. The circuit according to any one of Aspects 1 to 8, wherein the first switch and the second switch are insulated gate bipolar transistors.

Aspect 17. The circuit according to any one of Aspects 1 to 8, wherein the first input terminal and the second input terminal are respectively coupled to two ends of the bi-directional DC-DC converter.

Aspect 18. The circuit according to any one of Aspects 1 to 8, wherein one end of the first primary winding is coupled to the first input terminal, the other end of the first primary winding is coupled to one end of the first switch, and the other end of the first switch is coupled to the common terminal, and wherein one end of the second primary winding is coupled to the second input terminal, the other end of the second primary winding is coupled to one end of the second switch, and the other end of the second switch is coupled to the common terminal.

Aspect 19. A bi-directional DC-DC converter, including: the circuit according to any one of Aspects 1 to 18, and the control unit configured to enable or turn off the first controller and the second controller of the circuit.

Aspect 20. A method for operating the bi-directional DC-DC converter according to Aspect 19, including:
powering on at least one of the first input terminal and the second input terminal of the circuit;
powering on the DC output terminal by energy received by the first input terminal or the second input terminal and transformed by the first primary winding or the second primary winding and the common secondary winding;
supplying, by the DC output terminal, power to the control unit, and turning off, by the control unit, one of the first controller and the second controller; and
operating the bi-directional DC-DC converter in the forward mode or the reverse mode.

Aspect 21. The method according to Aspect 20, wherein a diameter of a copper wire of the second primary winding is equal to or less than 60% of a diameter of a copper wire of the first primary winding, the method further including:
in a case of the bi-directional DC-DC converter operating in the forward mode or the reverse mode, enabling the first controller and turning off the second controller by the control unit.

Aspect 22. The method according to Aspect 20, wherein a diameter of a copper wire of the first primary winding is equal to or less than 60% of a diameter of a copper wire of the second primary winding, the method further including:
　　in a case of the bi-directional DC-DC converter operating in the forward mode or the reverse mode, enabling the second controller and turning off the first controller by the control unit.

Aspect 23. The method according to Aspect 20, further including, in a case that the first input terminal and the second input terminal are powered on simultaneously:
　　powering on the DC output terminal by energy received by the first input terminal and the second input terminal and transformed by the first primary winding, the second primary winding and the common secondary winding;
　　supplying power to the control unit by the DC output terminal, and determining, by the control unit, whether to turn off the first controller or the second controller, based on a received instruction indicating whether the bi-directional DC-DC converter operates in the forward mode or the reverse mode; and
　　operating the bi-directional DC-DC converter in the forward mode or the reverse mode.

Although the implementations of the present disclosure have been described above in detail with reference to the drawings, it should be understood that the above-described implementations are merely used for illustrating the present disclosure and are not intended to limit the present disclosure. Those skilled in the art can make various modifications and variations to the above-described implementations without departing from the substance and scope of the present disclosure. Accordingly, the scope of the present disclosure is defined only by the appended claims and their equivalents.

The invention claimed is:

1. A circuit for a bi-directional direct current to direct current (DC-DC) converter, comprising:
　　a first input terminal configured to receive a first DC input;
　　a second input terminal configured to receive a second DC input;
　　a DC output terminal;
　　a first switch;
　　a second switch;
　　a first control interface configured to control the first switch to be switched on and off;
　　a second control interface configured to control the second switch to be switched on and off;
　　a first primary winding coupled in series with the first switch between the first input terminal and a first common terminal;
　　a second primary winding coupled in series with the second switch between the second input terminal and a second common terminal;
　　a common secondary winding with one end coupled to the DC output terminal;
　　a first diode, wherein an anode of the first diode is coupled to the first input terminal, and a cathode of the first diode is coupled to a first end of the first primary winding to enable a first current to flow from the first input terminal, through the first diode, to the first primary winding; and
　　a second diode, wherein an anode of the second diode is coupled to the second input terminal, and a cathode of the second diode is coupled to a first end of the second primary winding to enable a second current to flow from the second input terminal, through the second diode, to the second primary winding.

2. The circuit according to claim 1, further comprising a control unit powered by the DC output terminal and configured to control the first switch to be switched on and off through the first control interface and control the second switch to be switched on and off through the second control interface.

3. The circuit according to claim 2, wherein the first control interface further comprises a first controller configured to provide a signal for controlling the first switch to be switched on and off,
　　wherein the second control interface further comprises a second controller configured to provide a signal for controlling the second switch to be switched on and off, and
　　wherein the control unit is configured to provide a control signal for turning on or off the first controller and the second controller, respectively.

4. The circuit according to claim 3, wherein the bi-directional DC-DC converter is configured to operate in a forward mode and a reverse mode:
　　for the bi-directional DC-DC converter operating in the forward mode:
　　　　the first input terminal is powered on, and the first controller operates,
　　　　the DC output terminal is powered on by energy received by the first input terminal and transformed by the first primary winding and the common secondary winding,
　　　　the DC output terminal supplies power to the control unit, and the control unit turns off the second controller, and
　　　　the bi-directional DC-DC converter operates in the forward mode; and
　　for the bi-directional DC-DC converter operating in the reverse mode:
　　　　the second input terminal is powered on, and the second controller operates,
　　　　the DC output terminal is powered on by energy received by the second input terminal and transformed by the second primary winding and the common secondary winding, and
　　　　the DC output terminal supplies power to the control unit, and the control unit turns off the first controller.

5. The circuit according to claim 3, wherein a diameter of a copper wire of the second primary winding is equal to or less than 60% of a diameter of a copper wire of the first primary winding.

6. The circuit according to claim 5, wherein the bi-directional DC-DC converter is configured to operate in a forward mode and a reverse mode:
　　for the bi-directional DC-DC converter operating in the forward mode:
　　　　the first input terminal is powered on, and the first controller operates,
　　　　the DC output terminal is powered on by energy received by the first input terminal and transformed by the first primary winding and the common secondary winding,
　　　　the DC output terminal supplies power to the control unit, and the control unit turns off the second controller, and
　　　　the bi-directional DC-DC converter operates in the forward mode; and
　　for the bi-directional DC-DC converter operating in the reverse mode:

the second input terminal is powered on, and the second controller operates, the DC output terminal is powered on by energy received by the second input terminal and transformed by the second primary winding and the common secondary winding, the DC output terminal supplies power to the control unit, and the control unit turns off the first controller, the bi-directional DC-DC converter operates in the reverse mode, and the first input terminal is powered on, and the control unit enables the first controller and turns off the second controller.

7. The circuit according to claim 3, wherein a diameter of a copper wire of the first primary winding is equal to or less than 60% of a diameter of a copper wire of the second primary winding.

8. The circuit according to claim 7, wherein the bi-directional DC-DC converter is configured to operate in a forward mode and a reverse mode:

for the bi-directional DC-DC converter operating in the forward mode:

the first input terminal is powered on, and the first controller operates, the DC output terminal is powered on by energy received by the first input terminal and transformed by the first primary winding and the common secondary winding, the DC output terminal supplies power to the control unit, and the control unit turns off the second controller, the bi-directional DC-DC converter operates in the forward mode, and the second input terminal is powered on, and the control unit enables the second controller and turns off the first controller; and for the bi-directional DC-DC converter operating in the reverse mode:

the second input terminal is powered on, and the second controller operates, the DC output terminal is powered on by energy received by the second input terminal and transformed by the second primary winding and the common secondary winding, the DC output terminal supplies power to the control unit, and the control unit turns off the first controller, and the bi-directional DC-DC converter operates in the reverse mode.

9. The circuit according to claim 3, wherein in a case that the first input terminal and the second input terminal are powered on simultaneously, the first controller and the second controller operate simultaneously, and wherein the control unit is configured to determine, based on a received instruction indicating whether the bi-directional DC-DC converter operates in a forward mode or a reverse mode, whether to turn off the first controller or the second controller.

10. The circuit according to claim 2, further comprising: a third diode, wherein the third diode and the common secondary winding are coupled in series between the DC output terminal and a third common terminal.

11. The circuit according to claim 10, further comprising a resistance capacitance diode (RCD) absorption circuit.

12. The circuit according to claim 11, wherein the RCD absorption circuit comprises a fourth diode, a first resistor, and a first capacitor, and wherein the fourth diode is coupled between the first primary winding and the first resistor and the first capacitor that are connected in parallel.

13. The circuit according to claim 12, further comprising a second RCD absorption circuit, wherein the second RCD absorption circuit comprises a fifth diode, a second resistor, and a second capacitor, and wherein the fifth diode is coupled between the second primary winding and the second resistor and the second capacitor that are connected in parallel.

14. The circuit according to claim 11, wherein the RCD absorption circuit comprises a fourth diode, a first resistor, and a first capacitor, and wherein the fourth diode is coupled between the second primary winding and the first resistor and the first capacitor that are connected in parallel.

15. The circuit according to claim 10, further comprising:

a first capacitor; and a second capacitor, wherein the first capacitor is connected in parallel with the first diode, and the second capacitor is connected in parallel with the second diode, such that the first switch and the second switch are soft-switched on or off.

16. The circuit according to claim 1, wherein the first switch and the second switch are insulated gate bipolar transistors.

17. The circuit according to claim 1, wherein the first input terminal and the second input terminal are respectively coupled to two ends of the bi-directional DC-DC converter.

18. The circuit according to claim 1, wherein the first end of the first primary winding is coupled to the first input terminal, a second end of the first primary winding is coupled to a first end of the first switch, and a second end of the first switch is coupled to the first common terminal, wherein the first primary winding is arranged, in series, between the first input terminal and the first end of the first switch, and wherein the first primary winding is arranged, in series, between the first input terminal and the second end of the first switch, and wherein the first end of the second primary winding is coupled to the second input terminal, a second end of the second primary winding is coupled to a first end of the second switch, and a second end of the second switch is coupled to the second common terminal, wherein the second primary winding is arranged, in series, between the second input terminal and the first end of the second switch, and wherein the second primary winding is arranged, in series, between the second input terminal and the second end of the second switch.

19. The circuit according to claim 1, wherein the first switch includes a first switch terminal coupled to a second end of the first primary winding, and a second switch terminal coupled to the first common terminal such that the first current is enabled to flow through the first diode, the first primary winding, and the first switch via first series connections, and wherein the second switch includes a first switch terminal coupled to a second end of the second primary winding, and a second switch terminal coupled to the second common terminal such that the second current is enabled to flow through the second diode, the second primary winding, and the second switch via second series connections.

20. The circuit according to claim 19, wherein the first switch terminal and the second switch terminal of the first switch are arranged, in series, between the second end of the first primary winding and the first common terminal, and
wherein the first switch terminal and the second switch terminal of the second switch are arranged, in series, between the second end of the second primary winding and the second common terminal.

21. A bi-directional direct current to direct current (DC-DC) converter, comprising:
a first input terminal configured to receive a first DC input;
a second input terminal configured to receive a second DC input;
a DC output terminal;
a first switch;
a second switch;
a first control interface configured to control the first switch to be switched on and off;
a second control interface configured to control the second switch to be switched on and off;
a first primary winding coupled in series with the first switch between the first input terminal and a first common terminal;
a second primary winding coupled in series with the second switch between the second input terminal and a second common terminal;
a first diode, wherein an anode of the first diode is coupled to the first input terminal, and a cathode of the first diode is coupled to a first end of the first primary winding;
a second diode, wherein an anode of the second diode is coupled to the second input terminal, and a cathode of the second diode is coupled to a first end of the second primary winding;
a common secondary winding with one end coupled to the DC output terminal; and
a control unit configured to enable or turn off the first control interface and the second control interface.

22. A method for operating a bi-directional direct current to direct current (DC-DC) converter comprising a first input terminal configured to receive a first DC input, a second input terminal configured to receive a second DC input, a DC output terminal, a first switch, a second switch, a first control interface configured to control the first switch to be switched on and off, a second control interface configured to control the second switch to be switched on and off, a first primary winding coupled in series with the first switch between the first input terminal and a first common terminal, a second primary winding coupled in series with the second switch between the second input terminal and a second common terminal, a common secondary winding with one end coupled to the DC output terminal, and a control unit configured to enable or turn off the first control interface and the second control interface, the method comprising:
powering on at least one of the first input terminal or the second input terminal;
powering on the DC output terminal by energy received by the first input terminal or the second input terminal and transformed by the first primary winding or the second primary winding and the common secondary winding;
supplying, by the DC output terminal, power to the control unit;
turning off, by the control unit, one of the first control interface or the second control interface;
operating the bi-directional DC-DC converter in a forward mode or a reverse mode; and
in a case that the first input terminal and the second input terminal are powered on simultaneously:
powering on the DC output terminal by energy received by the first input terminal and the second input terminal and transformed by the first primary winding, the second primary winding, and the common secondary winding;
supplying power to the control unit by the DC output terminal, and determining, by the control unit, whether to turn off the first control interface or the second control interface, based on a received instruction indicating whether the bi-directional DC-DC converter operates in the forward mode or the reverse mode; and
operating the bi-directional DC-DC converter in the forward mode or the reverse mode.

23. The method according to claim 22, wherein a diameter of a copper wire of the second primary winding is equal to or less than 60% of a diameter of a copper wire of the first primary winding, the method further comprising:
in a case of the bi-directional DC-DC converter operating in the forward mode or the reverse mode, enabling the first control interface and turning off the second control interface by the control unit.

24. The method according to claim 22, wherein a diameter of a copper wire of the first primary winding is equal to or less than 60% of a diameter of a copper wire of the second primary winding, the method further comprising:
in a case of the bi-directional DC-DC converter operating in the forward mode or the reverse mode, enabling the second control interface and turning off the first control interface by the control unit.

25. A circuit for a bi-directional direct current to direct current (DC-DC) converter, comprising:
a first input terminal configured to receive a first DC input;
a second input terminal configured to receive a second DC input;
a DC output terminal;
a first switch;
a second switch;
a first control interface configured to control the first switch to be switched on and off;
a second control interface configured to control the second switch to be switched on and off;
a first primary winding coupled in series with the first switch between the first input terminal and a first common terminal;
a second primary winding coupled in series with the second switch between the second input terminal and a second common terminal;
a common secondary winding with one end coupled to the DC output terminal; and
a control unit powered by the DC output terminal and configured to control the first switch to be switched on and off through the first control interface and control the second switch to be switched on and off through the second control interface,
wherein the first control interface further comprises a first controller configured to provide a signal for controlling the first switch to be switched on and off,
wherein the second control interface further comprises a second controller configured to provide a signal for controlling the second switch to be switched on and off, wherein the control unit is configured to provide a control signal for turning on or off the first controller and the second controller, respectively, and wherein the bi-directional DC-DC converter is configured to operate in a forward mode and a reverse mode:

for the bi-directional DC-DC converter operating in the forward mode:
- the first input terminal is powered on, and the first controller operates,
- the DC output terminal is powered on by energy received by the first input terminal and transformed by the first primary winding and the common secondary winding,
- the DC output terminal supplies power to the control unit, and the control unit turns off the second controller, and
- the bi-directional DC-DC converter operates in the forward mode; and for the bi-directional DC-DC converter operating in the reverse mode:
- the second input terminal is powered on, and the second controller operates,
- the DC output terminal is powered on by energy received by the second input terminal and transformed by the second primary winding and the common secondary winding, and
- the DC output terminal supplies power to the control unit, and the control unit turns off the first controller.

26. The circuit according to claim 25, wherein in a case that the first input terminal and the second input terminal are powered on simultaneously, the first controller and the second controller operate simultaneously, and wherein the control unit is configured to determine, based on a received instruction indicating whether the bi-directional DC-DC converter operates in a forward mode or a reverse mode, whether to turn off the first controller or the second controller.

* * * * *